United States Patent
Sterngold

(10) Patent No.: US 11,449,488 B2
(45) Date of Patent: Sep. 20, 2022

(54) SYSTEM AND METHOD FOR PROCESSING LOGS

(71) Applicant: Shipbook Ltd., Zichron Yaakov (IL)

(72) Inventor: Elisha Sterngold, Zikhron Yaakov (IL)

(73) Assignee: Shipbook Ltd., Zichron Yaakov (IL)

( * ) Notice: Subject to any disclaimer, the term of this patent is extended or adjusted under 35 U.S.C. 154(b) by 354 days.

(21) Appl. No.: 16/729,627

(22) Filed: Dec. 30, 2019

(65) Prior Publication Data

US 2021/0200740 A1    Jul. 1, 2021

(51) Int. Cl.

| | | |
|---|---|---|
| G06F 16/00 | (2019.01) | |
| G06F 16/23 | (2019.01) | |
| G06F 16/28 | (2019.01) | |
| G06F 11/34 | (2006.01) | |
| G06F 11/30 | (2006.01) | |
| G06N 3/08 | (2006.01) | |
| H04L 9/06 | (2006.01) | |

(52) U.S. Cl.
CPC ........ *G06F 16/2358* (2019.01); *G06F 11/302* (2013.01); *G06F 11/3476* (2013.01); *G06F 16/285* (2019.01); *G06N 3/08* (2013.01); *H04L 9/0643* (2013.01)

(58) Field of Classification Search
CPC .......................... G06F 16/2358; G06F 16/285
USPC .......................................................... 707/737
See application file for complete search history.

(56) References Cited

U.S. PATENT DOCUMENTS

| | | | | |
|---|---|---|---|---|
| 2015/0169497 A1* | 6/2015 | Fried | ................... | G06F 12/0822 709/214 |
| 2015/0207855 A1* | 7/2015 | Hanckel | .............. | H04L 67/1097 709/201 |
| 2018/0095731 A1* | 4/2018 | Brown | .................. | G06F 11/362 707/707 |
| 2018/0300117 A1* | 10/2018 | Ackerman | .......... | G06F 11/0709 707/707 |
| 2019/0384775 A1* | 12/2019 | Wen | ..................... | G06F 16/2379 707/707 |
| 2020/0201699 A1* | 6/2020 | Yu | ........................ | G06F 11/0769 707/707 |
| 2021/0055727 A1* | 2/2021 | Goldman-Shenhar | ...................... | B60W 60/0059 707/707 |

* cited by examiner

*Primary Examiner* — Alexandria Y Bromell

(57) ABSTRACT

A system for processing logs comprising at least one computing device adapted to: receiving a plurality of historical logs each generated by at least one client computing device when executing at least one software object generated from at least one source code file, each of the plurality of historical logs is associated with one of a plurality of sessions and comprising log data and a location value identifying a location in the at least one source code file; generating a plurality of log clusters, each log cluster comprising a plurality of logs of the plurality of historical logs, each of the plurality of logs of the respective log cluster comprising a common location value; and in at least one of a plurality of iterations: receiving from the at least one client computing device, via at least one digital communication network interface connected to the at least one computing device.

20 Claims, 6 Drawing Sheets

SYSTEM AND METHOD FOR PROCESSING LOGS

FIELD AND BACKGROUND OF THE INVENTION

The present invention, in some embodiments thereof, relates to a system for processing logs and, more specifically, but not exclusively, to a system for processing logs collected from a plurality of log sources.

As used henceforth, the term software object means an ordered group of computer instructions which may be executed by a processing unit. As used henceforth, the term processing unit means any kind of programmable circuitry that is configured to carry out the operations described below. The processing unit may comprise hardware as well as software. For example, the processing unit may comprise one or more processors and a transitory or non-transitory memory that carries one or more software objects which cause the processing unit to perform the respective operations when the one or more software objects are executed by the one or more processors. Some examples of a software object are a software program, a script, a dynamically linked library (DLL), a mobile software application and a web based application. In addition, as used henceforth, a log is a record generated by a software object typically, but not exclusively, to report an event related to execution status of the software object.

It is common practice for a software object to log its execution status. In many computerized systems, a software object outputs one or more logs to report one or more events that occurred when executing the software object by a processing unit.

A log may comprise one or more values indicative of an event that occurred when executing the software object. Some of the one or more values may indicate a severity of the event, for example an error condition or an operation warning. Some of the one or more values may describe the event, for example "a parsing error". Some other of the one or more values may be indicative of operation parameters pertaining to the event, for example a name of a user or a version identifier of the software object. In some systems at least some of the one or more values are encrypted.

A plurality of logs collected from a computerized system may be used to monitor operation of the computerized system and to identify one or more conditions in the operation of the computerized system. For example, there may be a need to identify a problem in the operation of the computerized system. Some examples of a problem in the operation of the computerized system are a failure of a software object to access storage, a data format not supported by the software object, a programming error, and a failure of the software object to execute a computer instruction. Another example of a condition in the operation of the computerized system is resource utilization exceeding an identified threshold. Such a condition may not be a problem but there may be a need to identify it. There is a need to interpret and analyze the plurality of logs for the purpose of monitoring and managing operation of the computerized system, and for the purpose of identifying and correcting problems in the operation of the computerized system.

SUMMARY OF THE INVENTION

It is an object of the present invention to provide a system and a method for processing logs.

The foregoing and other objects are achieved by the features of the independent claims. Further implementation forms are apparent from the dependent claims, the description and the figures.

According to a first aspect of the invention, a system for processing logs comprises at least one computing device adapted to: receiving a plurality of historical logs each generated by at least one client computing device when executing at least one software object generated from at least one source code file, each of the plurality of historical logs is associated with one of a plurality of sessions and comprising log data and a location value identifying a location in the at least one source code file; generating a plurality of log clusters, each log cluster comprising a plurality of logs of the plurality of historical logs, each of the plurality of logs of the respective log cluster comprising a common location value; and in at least one of a plurality of iterations: receiving from the at least one client computing device, via at least one digital communication network interface connected to the at least one computing device, at least one log comprising current log data and a current location value identifying a current location in the at least one source code file; adding the at least one log to at least one log cluster of the plurality of log clusters, selected according to the current location value; analyzing the plurality of logs of at least one of the at least one log cluster to identify at least one state in execution of the at least one software object; and adding the at least one state to a monitoring process for detecting, when the at least one client computing device executes the at least one software object, the at least one state.

According to a second aspect of the invention, a method for processing logs comprises: receiving a plurality of historical logs each generated by at least one client computing device when executing at least one software object generated from at least one source code file, each of the plurality of historical logs is associated with one of a plurality of sessions and comprising log data and a location value identifying a location in the at least one source code file; generating a plurality of log clusters, each log cluster comprising a plurality of logs of the plurality of historical logs, each of the plurality of logs of the respective log cluster comprising a common location value; and in at least one of a plurality of iterations: receiving from the at least one client computing device, via at least one digital communication network interface connected to the at least one computing device, at least one log comprising current log data and a current location value identifying a current location in the at least one source code file; adding the at least one log to at least one log cluster of the plurality of log clusters, selected according to the current location value; analyzing the plurality of logs of at least one of the at least one log cluster to identify at least one state in execution of the at least one software object; and adding the at least one state to a monitoring process for detecting, when the at least one client computing device executes the at least one software object, the at least one state.

According to a third aspect of the invention, a system for generating executable software comprises at least one computing device adapted to: producing for each of a plurality of log generation instructions identified in at least one source code file a source code location value indicative of a location of the log generation instructions in the at least one source code file; modifying each of the plurality of log generation instructions to include the respective source code location value in a generated log; producing at least one software object using the modified plurality of log generation instructions; and providing the at least one software object to at least one client processing device for generating at least one log indicative of at least one state when providing a service implemented by the at least one software object.

With reference to the first and second aspects, in a first possible implementation of the first and second aspects of the present invention the plurality of historical logs are further clustered in the plurality of clusters of logs according to the respective log data, where the respective log data is encrypted, without decrypting the respective log data, and selecting the at least one log cluster of the plurality of log clusters further comprises selecting the at least one log cluster according to the current log data, where the current log data is encrypted, without decrypting the current log data. Optionally, the plurality of historical logs are further clustered in the plurality of clusters of logs according to a hash value computed for the log data, and selecting the at least one log cluster of the plurality of log clusters further comprises selecting the at least one log cluster according to a current hash value computed for the current log data. Classifying according to the encrypted value of the log data and additionally of alternatively according to a hash value computed for the log data facilitates identifying the one or more conditions without decrypting the log data, increasing system security.

With reference to the first and second aspects, in a second possible implementation of the first and second aspects of the present invention the plurality of historical logs are further clustered in the plurality of clusters of logs according to a pattern identified in a sequence of location values of a sequence of historical logs of the plurality of historical logs, where the sequence of historical logs are associated with a common session of the plurality of sessions, and selecting the at least one log cluster of the plurality of log clusters further comprises selecting the at least one log cluster according to a new pattern identified in a new sequence of location values of a new sequence of logs of the plurality of logs comprising the at least one log, where the new sequence of logs are associated with a new common session. The new pattern is at least a prefix of the pattern. Optionally, the at least one state is identified according to the new pattern and adding the at least one state to the monitoring process comprises indicating at least some of the sequence of location values. Optionally, selecting the at least one log cluster according to the new pattern comprises using a neural network to compute at least one classification in response to input comprising the current location value. Classifying according to a pattern of location values of a sequence of logs associated with a session facilitates identifying a root cause of an identified condition. Using a prefix facilitates identifying a future condition according to the pattern, increasing usability of a system implemented according to the present invention. In addition, classifying according to the pattern of location values of the sequence of logs associated with a session facilitates identifying more than one root cause when an identified condition has more than one root cause, optionally where one root cause is associated with one location value and another root cause associated with another value. Using a neural network to compute the at least one classification increases accuracy of selecting the log cluster, increasing accuracy of an output of a system implemented according to the present invention.

With reference to the first and second aspects, in a third possible implementation of the first and second aspects of the present invention each of the at least one client processing device is one of a plurality of client processing devices, each adapted to executing the at least one software object.

With reference to the first and second aspects, in a fourth possible implementation of the first and second aspects of the present invention analyzing the plurality of logs of the at least one log cluster comprises analyzing a first plurality of logs of a first log cluster of the at least one log cluster. Optionally, each of the first plurality of logs of the first log cluster is associated with a plurality of attribute values of a plurality of attributes. Optionally, analyzing the first plurality of logs of the first log cluster comprises computing a plurality of statistical values according to the plurality of attribute values the first plurality of logs is associated therewith. Optionally, the plurality of attribute values comprises at least one of a plurality of attribute values consisting of: a session identification value, indicative of a session of a plurality of sessions of the at least one client computing device executing the at least one software object; a user identification value, indicative of a user of the at least one client computing device; a version identification indicative of a version of the at least one software object; an operating system version identification indicative of a version of an operating system executed by the at least one client processing device; a class value, indicative of a software class of the at least one software object; a function value, indicative of a software function of the at least one software object; a tag value, indicative of a system component of the at least one client processing device; a device type value indicative of a device type of the at least one client processing device; a device identification value, indicative of the at least one client processing device; a device manufacturer value; a language identification value; a region identification value, indicative of a geographical location; and a time value. Optionally, at least one of the plurality of statistical values is selected from a group of statistical values consisting of: an amount of sessions executed by the plurality of client computing devices, an amount of devices in the plurality of client computing devices, an amount of users of the plurality of client computing devices, an amount of time, a percentage that an amount of sessions identified in at least some of the plurality of logs is of the amount of sessions executed by the plurality of client computing devices, a percentage that an amount users identified in at least some of the plurality of logs is of the amount of users of the plurality of client computing devices, a percentage that an amount of devices identified in at least some of the plurality of logs is of the amount of devices in the plurality of client computing devices, an amount of logs, of a plurality of logs of a log cluster of the plurality of log clusters, associated with an identified operating system, a percentage that the amount of logs associated with the identified operating system is of an amount of logs in the plurality of logs of the log cluster, an amount of logs, of the plurality of logs of the log cluster, associated with an identified session, a percentage that the amount of logs associated with the identified session is of the amount of logs in the plurality of logs of the log cluster, an amount of logs, of the plurality of logs of the log cluster, associated with an identified user, a percentage that the amount of logs associated with the identified user is of the amount of logs in the plurality of logs of the log cluster, an amount of logs, of the plurality of logs of the log cluster, associated with an identified version, a percentage that the amount of logs associated with the identified version is of the amount of logs in the plurality of logs of the log cluster, an amount of logs, of the plurality of logs of the log cluster, associated with an identified device, a percentage that the amount of logs associated with the identified device is of the amount of logs in the plurality of logs of the log cluster, an amount of logs, of the plurality of logs of the log cluster, associated with an identified device type, a percentage that the amount of logs associated with the identified device type is of the amount of logs in the plurality of logs of the log cluster, an amount of at least some of the plurality of logs in an identified time interval, and a percentage that the amount of logs associated in the identified time interval is of the amount of logs in the plurality of logs of the log cluster. Optionally, adding the at least one state to the monitoring process comprises indicating at least some of the plurality of statistical values. Optionally, adding the at least one state to the monitoring process comprises sorting the at least one state according to at least one of the plurality of statistical values. Indicating at least some of the plurality of statistical values, and additionally or alternatively sorting the at least one state according to at least one of the plurality of statistical values, increases usability of a system implemented according to the present invention by adding salience to issues that require management attention.

With reference to the first and second aspects, in a fifth possible implementation of the first and second aspects of the present invention the at least one state is at least one of a group of states consisting of: an error in execution of at least one instruction of the at least one software object, a programming error, and an error in accessing at least one resource by the at least one software object. Optionally, the at least one resource is a resource of the at least one client processing device. Optionally, the system further comprises at least one server. Optionally, executing the at least one software object by the at least one client processing device comprises accessing at least one resource of the at least one server. Optionally, the group of states further consists of an error in execution of at least one server instruction of the at least one server. Optionally, an error in accessing a resource by the at least one software object comprises an error in the at least one software object accessing the at least one resource of the at least one server.

With reference to the first and second aspects, in a sixth possible implementation of the first and second aspects of the present invention the at least one client processing device is further adapted to: generating the at least one log comprising the current log data and the current location value identifying a current location in the at least one source code file, and sending the at least one log to the at least one computing device.

With reference to the first and second aspects, in a seventh possible implementation of the first and second aspects of the present invention the at least one computing device is further adapted to storing the plurality of historical logs and the at least one log in at least one non-volatile digital storage connected to the at least one computing device.

With reference to the first and second aspects, in an eighth possible implementation of the first and second aspects of the present invention the at least one computing device is further adapted to: generating a new log cluster associated with the current location value, subject to failing to select one of the plurality of log clusters according to the current location value; adding the at least one log to the new log cluster; and adding the new log cluster to the plurality of log clusters. Adding a new cluster after generation of the plurality of log clusters increases accuracy of clustering the at least one log, increasing accuracy of identification of the at least one state and thus increasing accuracy of an output of a management process using the at least one state.

With reference to the third aspect, in a first possible implementation of the third aspect of the present invention at least one of: the source code location value comprises a location value selected from an identified set of location values; the source code location value is indicative of at least one of: a file name and a line number in a file; modifying each of the log generation instructions comprises adding to at least one of the plurality of log generation instructions a directive of a source programming language of the at least one source code file; modifying each of the log generation instructions comprises adding to at least one of the plurality of log generation instructions at least one instruction to extract a code position value from a retrieved call stack; and producing for each of the plurality of log generation instructions a source code location value comprises extracting at least one source code location value from at least one of: at least one map file comprising information describing the at least one source file, and at least one symbol file comprising symbol information describing the at least one source file.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
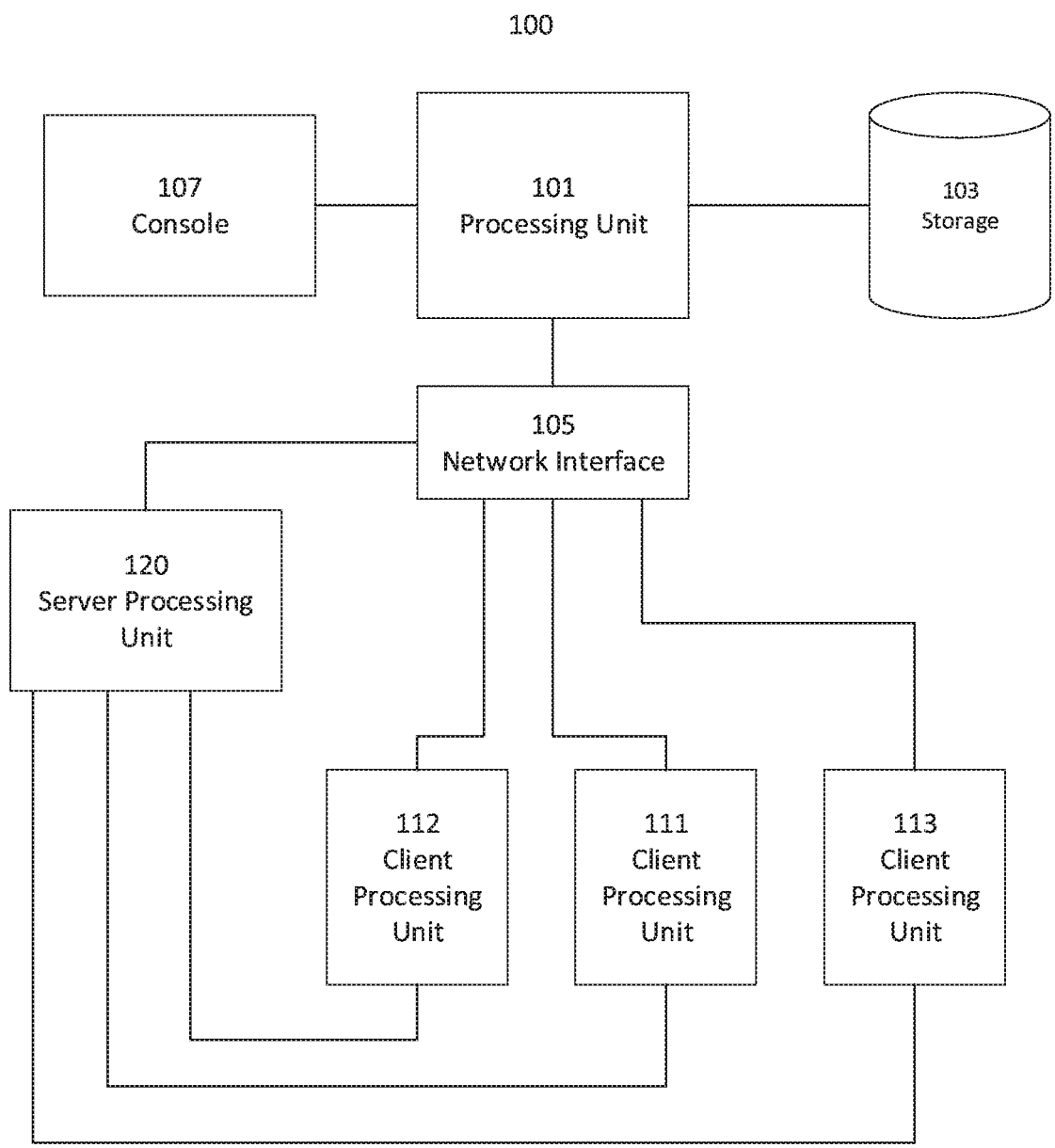
FIG. 1 is a schematic block diagram of an exemplary system for processing logs, according to some embodiments of the present invention.

The present invention, in some embodiments thereof, relates to a system for processing logs and, more specifically, but not exclusively, to a system for processing logs collected from a plurality of log sources.

There is a need to interpret and analyze a plurality of logs received from a computerized system. There is benefit to analyzing together the plurality of logs received from the computerized system. When the computerized system comprises more than one processing unit, there is benefit to analyzing together one or more groups of logs received from one or more processing units. An example of such a system is when the computerized system comprises a plurality of clients communicating with a common server. Another example is when the plurality of logs is received from a plurality of devices, each executing an identified software object such as a mobile application. For example, when some of the processing units execute a first version of a software object and some other of the processing units execute a second version of the software object, and when an identified error log is received only from those processing units executing the second version of the software object, a manager of the computerized system may resolve a problem in the second version of the software object by identifying an association between the identified error log and the second version of the software object, faster than by considering also the first version of the software object. In another example, analyzing together one or more groups of logs received from one or more processing units allows associating an identified condition with an identified device type.

To analyze together one or more groups of logs there is a need to identify in the plurality of logs one or more groups of similar logs, such that a group of similar logs have at least one common classification. Some existing solutions use logs comprising text, and use pattern matching to select from the plurality of logs a subset of logs having text that matches an identified pattern. Some methods for performing pattern matching include natural language processing methods, and using a machine learning model. Some pattern matching methods comprise comparing each of the plurality of logs to an identified pattern, for example a regular expression (regex) pattern. These solutions have known limitations when text in the log is encrypted. In addition, pattern matching based solutions are susceptible on the one hand to grouping together unrelated logs, while on the other hand to not identifying a connection between other logs. It is common practice in existing software programs to use a common software module within the software program to generate logs reporting conditions that occurred in other modules of the software program. Thus, for example, the software program may generate a log comprising the text "Error in parsing data" when reporting an error in parsing data received via an input to the software program and when reporting another error in parsing data received in one module of the software program from another module of the software program. In this example the error and the other error have two distinct root causes, however some existing solutions based on pattern matching may aggregate the two logs in one group, thus reducing accuracy of an error analysis using the group. In addition, some existing solutions based on pattern matching may require using in the pattern a value that is not known when creating the pattern. For example, when one group of the plurality of logs reports more than one condition, however each log in the group is related to a common identified user, some existing solutions based on pattern matching may require using in the pattern an identifier of the common identified user, and thus may not be able to aggregate the subset of the plurality of logs when such an identifier cannot be available when creating the pattern. Using such an identifier in a pattern may prevent a solution based on pattern matching from identifying another group of the plurality of logs related to more than one identified user however related to a common condition in execution of the software program.

Some solutions include a numerical code in each of the plurality of logs, indicative of an event that occurred in execution of the software program. However, in such solutions the numerical code does not encompass all information pertaining to the event, for example a user identification. In such solutions the plurality of logs may be clustered according to the numerical code, however such solutions may not be able to identify a relation between a group of logs related to other information pertaining to the event, for example a common identified user. In addition, such solutions do not allow clustering the plurality of logs according to some free text used by a developer.

An event occurring while executing one or more software objects may be associated with one or more locations in a plurality of source code files from which the one or more software objects were generated. To identify related logs in a plurality of logs the present invention proposes, in some embodiments thereof, using a location value in each of the plurality of logs, where the location value identifies a location in at least one source code file of one or more software objects. Some examples of a location are a file name, and a line number in a file. In such embodiments, the location value does not comprise a full retrieved call stack. Retrieving and processing a full call stack consumes processing resources and refraining from retrieving a full call stack reduces an amount of processing resources required to generate a log, as well as reduces an amount of data in the log, thus reducing an amount of storage required to store the log and an amount of processing resources required to deliver and process the log. Some examples of a location value are a file name value, a line number value, a code position value extracted from a retrieved call stack, a source code location value extracted from a map file comprising information describing the at least one source code file, and a location value selected from an identified set of location values, for example a set consisting of [a, b c]. Optionally, the one or more software objects are generated from the at least one source code file. In addition, the present invention proposes, in some embodiments thereof, using the location value to classify the plurality of logs. In such embodiments, the present invention proposes receiving a plurality of historical logs from one or more processing units, and clustering the plurality of logs into one or more log clusters according to the respective location value, such that all historical logs in a log cluster have a common location value classification. Optionally, the common location value classification is according to a common location value. Optionally, the common location value classification is according to an association between one or more location values, for example a plurality of source code locations pertaining to an identified functionality of the one or more software objects. Optionally, the common location value classification is computed by applying a classification test to the respective location value. Optionally, the common location value classification is computed by a neural network, in response to the respective location value. In addition, the present invention optionally proposes receiving in one or more iterations one or more new logs from one of the one or more processing units. Optionally, the one or more new logs received in an iteration comprise a current location value identifying a current location in the one or more source code files. Optionally, the one or more new logs are added to one of the one or more log clusters, according to a new classification of the current location value. When there is no log cluster associated with the new classification of the current location value a new log cluster may be created and the one or more new logs may be added to the new log cluster. Optionally, the one or more new logs are generated by the respective processing unit when the respective processing unit identifies one or more events in the execution of the one or more software objects thereby. Optionally, the current location value identifies a current location in the one or more source code files associated with the one or more events.

Henceforth the term "computing device" is used to mean a processing unit, and the terms are used interchangeably.

Optionally, the present invention proposes analyzing a plurality of logs of at least one of the one or more log clusters to identify one or more conditions in execution of the one or more software objects, and optionally outputting an indication of the one or more conditions. Optionally, a condition is a state in execution of the one or more software objects. Optionally, the present invention proposes adding the one or more conditions to a monitoring process for detecting the one or more conditions. Optionally, the monitoring process detects the one or more conditions when the one or more client computing device executes the one or more software objects. Using the indication of a location in one or more source code files to classify and cluster the plurality of logs reduces false correlation between one and more logs having similar textual log data and facilitates correlation between one or more related logs having different textual log data, increasing accuracy of an identification, based on the plurality of logs, of a condition in execution of the one or more software objects. In addition, using the indication of a location in one or more source code files to classify and cluster the plurality of logs allows classifying logs comprising encrypted text, increasing usability of a system for processing logs according to the present invention compared to other log processing systems using other methods such as pattern matching.

Optionally, according to some embodiments of the present invention, there is a hierarchy among the plurality of log clusters, such that for at least one of the one or more log clusters, a plurality of logs of the at least one log cluster is further clustered into a plurality of sub-clusters. Optionally, each of the plurality of logs comprises log data, and the plurality of logs are clustered in the plurality of sub-clusters according to the respective log data, optionally using the respective log data as a whole. The plurality of logs may be clustered in the plurality of sub-clusters according to a fingerprint value computed using the log data, for example a hash value. When the log data is encrypted, the plurality of logs may be clustered in the plurality of sub-clusters according to an encrypted value of the log data. Classifying according to the encrypted value of the log data facilitates identifying the one or more conditions without decrypting the log data, increasing system security. Optionally, each of the plurality of logs is associated with a plurality of attribute values of a plurality of attributes. Some examples of an attribute are a version of one or more software objects, a version of an operating system executed by the respective processing unit from which the log was received, and a device type. Optionally, a log of the plurality of logs comprises at least some of the plurality of attribute values associated therewith. Optionally, the plurality of attribute values comprises a session identification value indicative of a session of a user using an application. An example of a session identification value is a Globally Unique Identifier (GUID). Optionally, the session identification value is indicative of a communication session between the respective processing unit and an identified server processing unit. Optionally, the plurality of logs is clustered into the plurality of sub-clusters according to one or more of the plurality of attribute values, for example within one log cluster the plurality of logs may be classified according to a device type value, indicative of a device type of the respective processing unit. Optionally, the plurality of logs are clustered into the plurality of sub-clusters according to a session identification value. Optionally, a sub-cluster has at least some attribute values of at least some of the plurality of logs of the sub-cluster, for example a session identification value or an operating system identification value. Optionally, each of the plurality of logs of the sub-cluster is associated with the at least some attribute values of the sub-cluster. Optionally, the plurality of logs are clustered into the plurality of sub-clusters according to a pattern identified in a sequence of location values of a sequence of logs of the plurality of logs having a common session identification value. Classifying according to a pattern of location values of a sequence of logs associated with a session facilitates identifying a root cause of an identified condition, and additionally or alternatively facilitates identifying a future condition according to the pattern, increasing usability of a system implemented according to the present invention. In addition, classifying according to the pattern of location values of the sequence of logs associated with a session facilitates identifying more than one root cause when an identified condition has more than one root cause.

Optionally, analyzing the plurality of logs of a log cluster comprises computing a plurality of statistical values according to the plurality of attribute values the plurality of logs are associated therewith. Some examples of a statistical value computed according to the plurality of attribute values are an amount of sessions, an amount of logs associated with an identified session, and a percentage an amount of a first plurality of sessions identified in the plurality of logs of the cluster is of an amount of a second plurality of sessions identified in the plurality of historical logs (indicative of a prevalence of the location value classification of the log cluster in the system).

Optionally, analyzing the plurality of logs of the at least one log cluster is executed when the one or more new logs are received. Analyzing the plurality of logs when the one or more new logs are received reduces a latency in identifying the one or more conditions in execution of the one or more software objects. Optionally, analyzing the plurality of logs of the at least one log cluster is executed when the one or more new logs is associated with a severity attribute with a value exceeding an identified severity threshold, for example when the one or more new logs are associated with a severity attribute value of "error", whereas when the one or more new logs are associated with a severity attribute value of "info" analyzing the plurality of logs may not be executed. Analyzing the plurality of logs subject to a severity attribute value reduces an amount of analysis executed when there are few error conditions, reducing cost of operation of a log processing system implemented according to the present invention.

Optionally, analyzing the plurality of logs of the at least one log cluster is executed periodically. Periodically analyzing the plurality of logs facilitates mitigating an amount of analysis executed, without losing an ability to identify the one or more conditions in execution of the one or more software objects, thus reducing cost of operation of a log processing system implemented according to the present invention without reducing accuracy of an output thereof.

In some embodiments of the present invention, outputting the indication of the one or more conditions comprises sorting the one or more conditions according to one or more statistical values computed when analyzing the plurality of logs. For example, according to a session identification value. Another example is sorting the one or more conditions according to a percentage of devices in a group associated with a condition from a total amount of device identified in the plurality of logs. Yet another example is sorting the one or more conditions according to a section of a software application, optionally identified according to the respective location value, such as an identified screen of the software application. Optionally, a section of a software application correlates with a section of a user process in using the software application. As the location value is indicative of a location in the one or more source code files of the one or more software objects, the location value may be indicative of a functionality of the one or more software objects, for example a section of the user process in using the software application. Sorting according to a location value allows prioritizing one functionality of the one or more software objects over another functionality of the one or more software objects. Sorting the one or more conditions assists a manager in identifying a condition having greater significance that other conditions faster than when using an unsorted list of conditions, thus increasing availability of a system implementing the present invention for processing logs. Using more than one statistical value when sorting the one or more conditions allows tuning the indication of the one or more conditions according to operational requirements of the system, thus increasing availability of the system.

In addition, the present invention in some embodiments thereof proposes generating executable software for generating one or more logs comprising a location value. Optionally, generating the executable software comprises modifying one or more log generation instructions identified in a source code file to each include a source code location value indicative of the respective log generation instructions. Modifying the one or more log generation instructions to include a source code location value facilitates clustering a plurality of logs generated by the executable software when executed by one or more processing units according to the source code file location, improving accuracy of an output of an analysis based on the clustering of the plurality of logs. In computer programming, a directive is a source code language construct that specifies how a compiler or other translator should process its input. Some programming languages, for example swift, have one or more directives for extracting a source code location value, for example a file name or a line number. When the source code file is in such a programming language, modifying the one or more instructions to generate a log may comprise adding to at least one instruction a directive of the programming language. Using a directive of a programming language facilitates adding to a log an accurate source code location value without negatively impacting execution time and complexity of the software program. Providing an accurate source code location value increases accuracy of a result of analyzing the plurality of logs. Optionally, modifying the one or more instructions to generate a log comprises adding thereto at least one instruction to extract a code position value from a retrieved call stack, for example when a source file is in java. Using a code position extracted from a call stack facilitates acing to a log an accurate source code location value when the programming language does not support directives for extracting the source code location. Optionally, modifying the one or more instructions to generate a log comprises extracting one or more source code location values from one or more map files comprising information describing the source code file. Optionally, modifying the one or more instructions to generate a log comprises extracting one or more source code location values from one or more symbol files comprising symbol information describing the source code file. Using a source code location extracted from a map file facilitates providing an accurate source code location value when the software program is generated using obfuscated source code and the map file is unavailable, in which case a source code location extracted from a stack trace is according to a new source code location in an obfuscated file and not an original source code file. In addition, using a source code location extracted from a symbol file facilitates providing an accurate source code location value when the software program is symbolized, for example in iOS, and the symbol file is unavailable. Optionally, modifying the one or more instructions to generate a log comprises adding a location value selected from an identified set of location values, such that semantics of the identified set of location values are understood by a log processing system receiving the log. Using a value selected from an identified set of location values allows clustering the plurality of logs according to a location value when the programming language does not support any programming method to identify a source code location.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Henceforth the term "log cluster" is used to mean "cluster of logs" and the terms are used interchangeably. In addition, the term "log clusters" is used to mean "clusters of logs" and the terms are used interchangeably.

Reference is now made to FIG. 1, showing a schematic block diagram of an exemplary system 100 for processing logs, according to some embodiments of the present invention. In such embodiments, processing unit is connected to a plurality of client processing units, for example comprising client processing unit 111, client processing unit 112 and client processing unit 113. Optionally, at least some of the plurality of client processing units are connected to processing unit 101 via one or more digital communication network interface 105, which is connected to processing unit 101. For brevity, henceforth the term "network interface" is used to mean one or more digital communication network interface. Optionally, network interface 105 is connected to a local area network (LAN), for example an Ethernet LAN or a wireless LAN. Optionally, network interface 105 is connected to a wide area network (WAN), for example the Internet. Optionally, each of the plurality of client processing units is adapted to executing one or more software objects of an executable software, for example a software application. Other examples of a software object are an operating system, a DLL, a software script, a mobile software application and a web based application. Optionally, the plurality of client processing units are connected to server processing unit 120, optionally via another network interface connected to server processing unit 120. Optionally, executing the one or more software objects by each of the plurality of client hardware processing units comprises establishing one or more communication sessions with server processing unit 120. For brevity, the term session is henceforth used to mean an identified interactive engagement of a user with a software application. Optionally a session comprises a communication session, where a communication session is a temporary and interactive information interchange between two or more processing units, for example between server processing unit 120 and client processing unit 111. Optionally a session is a temporary and interactive information interchange between two or more of the plurality of client processing units, for example between client processing unit 111 and client processing unit 112.

Optionally, client processing unit 111 and client processing unit 112 send one or more logs to server processing unit 120. Optionally, server processing unit 120 sends the one or more logs received from client processing unit 111 and client processing unit 112 to processing unit 101.

Optionally, processing unit 101 is connected to one or more non-volatile digital storage 103, for example for the purpose of storing a plurality of historical logs received from the plurality of client processing units. For brevity, the term storage is used to mean one or more non-volatile digital storage. Some examples of a storage are a hard disk drive, a solid-state storage device, a storage network, and a network connected storage device. Optionally, processing unit 101 stores on storage 103 one or more logs received from one or more of the plurality of client processing units, for example client processing unit 111.

As used henceforth, a console is a physical device used for managing a computerized system. Some examples of a console are a monitor, a computer comprising a display screen, and a hand held device such as a tablet or a mobile phone. Optionally, processing unit 101 is connected to one or more consoles 107, optionally for the purpose of outputting one or more indications of one or more conditions detected when analyzing a plurality of logs. Optionally, processing unit 101 is electrically connected to one or more consoles 107, for example when one or more consoles 107 is a monitor. Optionally, processing unit 101 is connected to one or more consoles 107 via network interface 105. Optionally, processing unit 101 is connected to one or more consoles 107 via another network interface (not shown).

In some embodiments of the present invention system 100 implements the following optional method to process logs.

Figure 2:
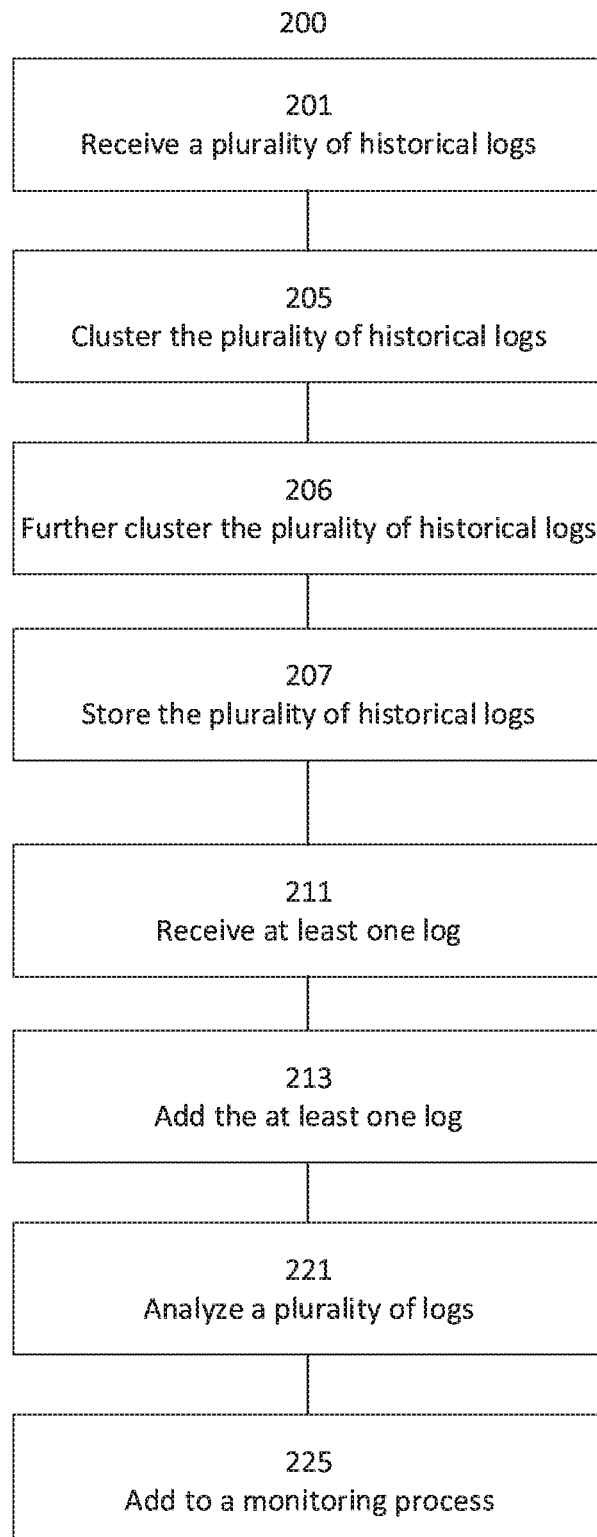
FIG. 2 is a flowchart schematically representing an optional flow of operations for processing logs, according to some embodiments of the present invention.

Reference is now made also to FIG. 2, showing a flowchart schematically representing an optional flow of operations 200 for processing logs, according to some embodiments of the present invention. In such embodiments, in 201 processing unit 101 receives a plurality of historical logs from one or more client processing units, for example the plurality of client processing units comprising client processing unit 111, client processing unit 112, and client processing unit 113. Optionally, each of the one or more client processing units is adapted to executing one or more software objects generated from one or more source code files. Optionally, executing the one or more software objects by a client processing unit, for example client processing unit 111, comprising establishing one or more sessions with at least one other processing unit, for example server processing unit 120. Optionally, each of the historical logs is associated with one of a plurality of sessions. Optionally, each of the historical logs is associated with an event in executing the one or more software objects on the one or more client processing units. Optionally, each of the historical logs comprises log data and a location value identifying a location in the one or more source code files. Optionally, the log data comprises text. Optionally, the log data is encrypted. Optionally, each of the plurality of historical logs is associated with a plurality of attribute values of a plurality of attributes. An example of an attribute value is a session identification value, where the session identification value identified one session of the plurality of sessions. Other examples of an attribute value are: a user identification value indicative of a user of the client processing unit, a version identification indicative of a version of the one or more software objects, an operating system version identification indicative of a version of an operating system executed by the client processing unit, a class value indicative of a software class of the one or more software objects, a function value indicative of a software function of the one or more software objects, a tag value indicative of a system component of the client processing device, a device type value indicative of a device type of the client processing unit, a device identification value, indicative of the client processing unit, for example indicative of client processing unit 111. Additional other examples of an attribute value include, and are not limited to: a device manufacturer value, a language identification value, a region identification value indicative of a geographical location, and a time value, for example a time value indicative of a time of an event occurrence or a time of receiving a log.

In 205, processing unit 111 optionally clusters the plurality of historical logs in a plurality of clusters of logs, according to the respective location value. Optionally, processing unit 111 processing unit 111 clusters the plurality of historical logs in the plurality of clusters of logs according to a respective classification of the respective location value. Optionally, processing unit 111 computes the respective classification of the respective location value by inputting the respective location value into a machine learning model, for example a neural network, trained to compute a classification in response to a location value. Optionally, the machine learning model is trained to compute the classification in response to the location value according to one or more relations between a plurality of location values identifying a plurality of locations in the one or more source code files. For example, some of the plurality of locations in the one or more source code files may be related to one or more instructions for accessing an identified computer resources, for example an identified storage. In this example, the machine learning model may be trained to compute a common identified classification in response to any of the some of the plurality of locations, related to the one or more instructions for accessing the identified computer resource. Optionally, processing unit 111 computes the respective classification by applying one or more classification tests to the respective location value. Optionally, the one or more classification tests define one or more relations between the plurality of location values identifying the plurality of locations in the one or more source code files. In 206, processing unit optionally 111 further clusters the plurality of historical logs in the plurality of clusters of logs according to the respective log data. For example, in one cluster of the plurality of clusters of logs, the plurality of logs of the one cluster may have at least one common log data value, for example an event description text value. When the log data is encrypted, the common log data value may be an encrypted value, in which case processing unit 111 optionally clusters the plurality of logs in the plurality of clusters of logs without decrypting the log data. Optionally, the common log data value is a hash value computed for the log data. Optionally, processing unit 111 further clusters the plurality of historical logs in the plurality of clusters of logs according to a pattern identified in a sequence of location values of a sequence of historical logs of the plurality of historical logs having a common session identification value. For example, in another cluster of the plurality of cluster logs, a first sequence of historical logs of the plurality of historical logs of the other cluster may have a first common session identification value and a second sequence of historical logs of the plurality of historical logs of the other cluster may have a second common session identification value. Further in this example, a first sequence of respective location values of the first sequence of historical logs and a second sequence of respective location values of the second sequence of historical logs may have a common identified pattern. In 207, processing unit 111 optionally stores the plurality of historical logs in storage 103. Optionally, processing unit 111 stores the plurality of clusters of logs in storage 103. In 211, processing unit 101 optionally receives from at least one client processing unit, for example client processing unit 111, one or more logs comprising current log data and a current location value identifying a current location in the one or more source code files. Optionally, the current log data is encrypted. Optionally, processing unit 101 receives the one or more logs from client processing unit 111 via network interface 105. Optionally, processing unit 101 stores the one or more logs in storage 103. Optionally, in 213, processing unit 101 adds the at least one log to at least one log cluster of the plurality of log clusters. Optionally, processing unit 101 selects the at least one log cluster according to the current location value. Optionally, processing unit 101 selects the at least one log cluster according to a new classification computed using the current location value. Optionally, processing unit 101 computes the new classification using the machine learning model trained to compute a classification in response to a location value. Optionally, processing unit 101 computes the new classification by applying the one or more classification tests to the current location value. Optionally, processing unit 101 further selects the at least one log cluster according to the current log data of the new log. Optionally, processing unit 101 further selects the at least one log cluster according to the current log data without decrypting the current log data. Optionally, processing unit 101 further selects the at least one log cluster according to a current hash value computed for the current log data. Optionally, processing unit 101 further selects the at least one log cluster according to a new pattern identified in a new sequence of location values of a new sequence of logs of the plurality of logs comprising the new log and having a common session identification value. Optionally, the new pattern is at least a prefix of the pattern.

When processing unit 101 fails to select one of the plurality of clusters of logs according to the current location value, for example when the plurality of clusters of logs does not comprise a cluster associated with the current location value, processing unit 101 may generate a new log cluster.

Figure 3:
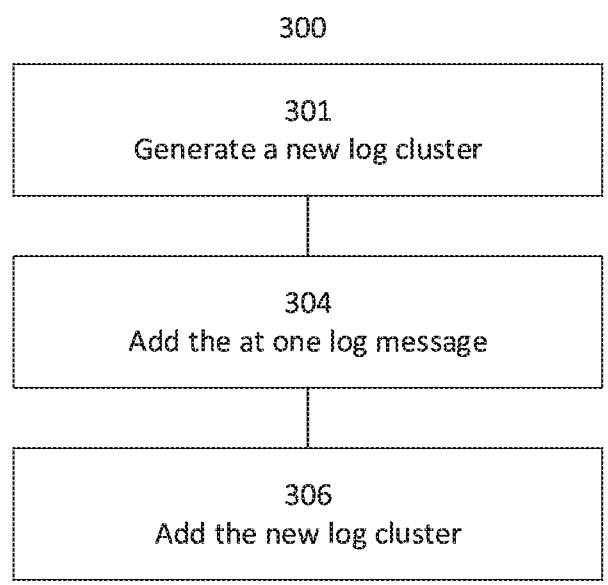
FIG. 3 is a flowchart schematically representing another optional flow of operations for processing logs, according to some embodiments of the present invention.

Reference is now made also to FIG. 3, showing a flowchart schematically representing another optional flow of operations 300 for processing logs, according to some embodiments of the present invention. In such embodiments, in 301 processing unit 101 generates a new log cluster associated with the current location value. In 304 processing unit 101 optionally adds the one or more new logs to the new log cluster and in 306 processing unit 101 optionally adds the new log cluster to the plurality of log clusters. Optionally, processing unit 101 stores the new log cluster in storage 103.

Reference is now made again to FIG. 2. In 211, processing unit 101 optionally analyzes a plurality of logs of at least one log cluster of the plurality of log clusters. Optionally, processing 101 analyzes the at least one log cluster the one or more new logs were added thereto. Optionally, processing unit 101 analyzes the plurality of logs of the at least one cluster to identify one or more conditions in execution of the one or more software objects. Optionally, the condition is a state in execution of the one or more software objects. An example of a state is an error in execution of at least one instruction of the one or more software objects, for example an instruction unsupported by client processing unit 111, an instruction unsupported by a version of an operating system executed by client processing unit 111, a memory exception, and a programming error (a bug) in a version of the one or more software objects. Another example of a state is an error in execution of at least one server instruction of server processing unit 120. Another example of a state is an error in accessing at least one resource by the one or more software objects, for example failure to authenticate a user, failure to access a storage, and an error in accessing a digital asset, for example an image, an audio file, and an identified group of digital assets such as a story line in a messaging platform. Another example of a state is a programming error. Optionally, the at least one resource is a resource of client processing unit 111. Optionally, the at least one resource is a resource of server processing unit 120. Other examples of an error in accessing the at least one resource of server processing unit 120 comprise a data format error, a failure to parse data, and incompatibility between a version of the one or more software objects and a version of another software objected executed by server processing unit 120.

Optionally, processing unit 101 identifies the one or more conditions according to the new pattern identified in the new sequence of location values of the new sequence of logs.

Optionally, analyzing the plurality of logs of the at least one cluster of logs comprises analyzing the plurality of logs by cluster, such that processing unit 101 analyzes a first plurality of logs of a first log cluster of the at least one cluster of logs. Optionally, analyzing the first plurality of logs computing a plurality of statistical values according to a plurality of attribute values of a plurality of attributes the first plurality of logs is associated therewith. Some examples of statistical values are: an amount of sessions executed by the plurality of client computing devices, an amount of devices in the plurality of client computing devices, an amount of users of the plurality of client computing devices, an amount of time, a percentage that an amount of sessions identified in at least some of the plurality of logs is of the amount of sessions executed by the plurality of client computing devices, a percentage that an amount users identified in at least some of the plurality of logs is of the amount of users of the plurality of client computing devices, a percentage that an amount of devices identified in at least some of the plurality of logs is of the amount of devices in the plurality of client computing devices, an amount of logs, of a plurality of logs of a log cluster of the plurality of log clusters, associated with an identified operating system, a percentage that the amount of logs associated with the identified operating system is of an amount of logs in the plurality of logs of the log cluster, an amount of logs, of the plurality of logs of the log cluster, associated with an identified session, a percentage that the amount of logs associated with the identified session is of the amount of logs in the plurality of logs of the log cluster, an amount of logs, of the plurality of logs of the log cluster, associated with an identified user, a percentage that the amount of logs associated with the identified user is of the amount of logs in the plurality of logs of the log cluster, an amount of logs, of the plurality of logs of the log cluster, associated with an identified version, a percentage that the amount of logs associated with the identified version is of the amount of logs in the plurality of logs of the log cluster, an amount of logs, of the plurality of logs of the log cluster, associated with an identified device, a percentage that the amount of logs associated with the identified device is of the amount of logs in the plurality of logs of the log cluster, an amount of logs, of the plurality of logs of the log cluster, associated with an identified device type, a percentage that the amount of logs associated with the identified device type is of the amount of logs in the plurality of logs of the log cluster, an amount of at least some of the plurality of logs in an identified time interval, a percentage that the amount of logs associated in the identified time interval is of the amount of logs in the plurality of logs of the log cluster Optionally, analyzing the plurality of logs comprises inputting the plurality of statistical values to one or more other machine models, for example one or more other neural networks. Additionally, or alternatively, analyzing the plurality of logs may comprise applying one or more statistical methods to the plurality of statistical values. Optionally, the plurality of statistical values is computed using a set of logs selected from the plurality of logs according to an identified time interval, optionally relative to a time of analyzing the plurality of logs.

In 225, processing unit 101 optionally adds the one or more conditions identified in 221 to a monitoring process for detecting the one or more states. Optionally, the monitoring process detects the one or more states when the one or more client computing devices execute the one or more software objects. Optionally, the monitoring process outputs an indication of the one or more conditions identified in 221. Optionally, outputting the indication comprises sending one or more messages to one or more consoles 107. Optionally, outputting the indication comprises displaying the one or more messages on at least one display of one or more consoles 107. Optionally, outputting the indication comprises sending one or more other messages to one or more other processing units, for example using an electronic mail protocol, an instant messaging protocol such as Slack, or a communication protocol with a code management system such as Atlassian JIRA. Optionally, for example when the one or more states are identified according to the new pattern, adding the one or more states to the monitoring process comprises indicating at least some of the sequence of location values. Optionally, adding the one or more states to the monitoring process comprises sorting the one or more states according to at least one of the plurality of statistical values. For example, the one or more states may be sorted according to a percentage of sessions identified in the at least one log cluster of a plurality of sessions identified in the plurality of log clusters. In another example, the one or more states are sorted according to an amount of devices identified in the one or more states. In another example, the one or more states are sorted according to a location value associated with the at least one log cluster. Optionally, adding the one or more states to the monitoring process comprises indicating at least some of the plurality of statistical values. Optionally, the at least one state comprises an increase in an amount of logs of the at least one cluster of logs in an identified duration of time, such that the amount of logs in the identified duration of time exceeds an identified log-rate threshold. Optionally, 211, 213, 221 and 225 are repeated in more than one iteration.

Optionally, 221 and 225 are executed when processing unit 101 receives the one or more new logs in 211 and adds the one or more logs to at least one log cluster in 213. Optionally, 221 and 225 are executed when a severity attribute value the one or more new logs are associated therewith exceeds an identified severity threshold, for example when the severity attribute value is indicative of an error. Optionally, 221 and 225 are executed periodically, for example to periodically analyze each of the plurality of log clusters.

In some embodiments of the present invention, client processing unit 111 executes the following optional method to send the one or more new logs comprising the current location value.

Figure 4:
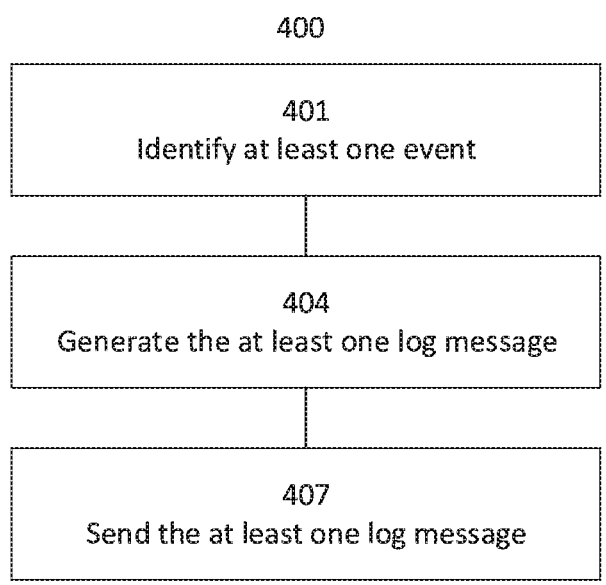
FIG. 4 is a flowchart schematically representing an optional flow of operations for generating a log, according to some embodiments of the present invention.

Reference is now made also to FIG. 4, showing a flowchart schematically representing an optional flow of operations 400 for generating a log, according to some embodiments of the present invention. In such embodiments, client processing unit 111 identifies in 401 one or more events in the execution of the one or more software objects thereon. Optionally, in 404 client processing unit 111 generates the one or more new logs comprising the current log data and the current location value. Optionally the current location value identifies a current location in the one or more source code files associated with the one or more events. In 407, processing unit 101 optionally sends the one or more new logs to processing unit 101.

According to some embodiments of the present invention, executable software, for example the one or more software objects, are generated such that executing the executable software by a client processing unit, for example client processing unit 111, sends one or more logs comprising a location value to processing unit 101.

Figure 5:
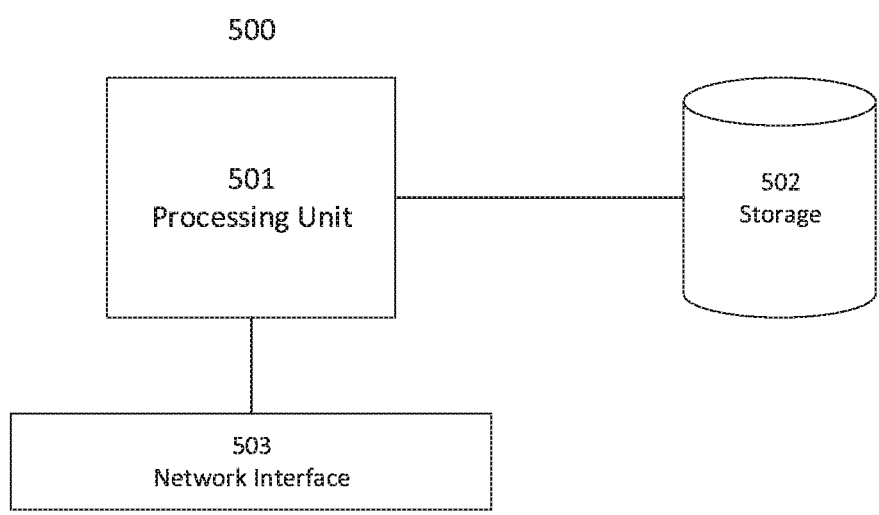
FIG. 5 is a schematic block diagram of an exemplary system for generating executable software, according to some embodiments of the present invention.

Reference is now made also to FIG. 5, showing a schematic block diagram of an exemplary system 500 for generating executable software, according to some embodiments of the present invention. In such embodiments, processing unit 501 is connected to storage 502 and to network interface 503. Optionally, processing unit 501 retrieves one or more source code files from storage 502. Optionally, processing unit 501 provides one or more software objects to client processing unit 111 by storing the one or more software objects on storage 502. Optionally, processing unit 501 provides one or more software objects to client processing unit 111, optionally by sending the one or more software objects to client processing unit 111 via network interface 503. Optionally, processing unit 501 provides the one or more software objects to client processing unit 111 by sending the one or more software objects to at least one application provision service, for example Google Play store and Apple App Store, optionally via network interface 503. Optionally, client processing unit 111 retrieves the one or more software objects from the at least one application provision service.

To generate executable software, in some embodiments of the present invention system 500 implements the following optional method.

Figure 6:
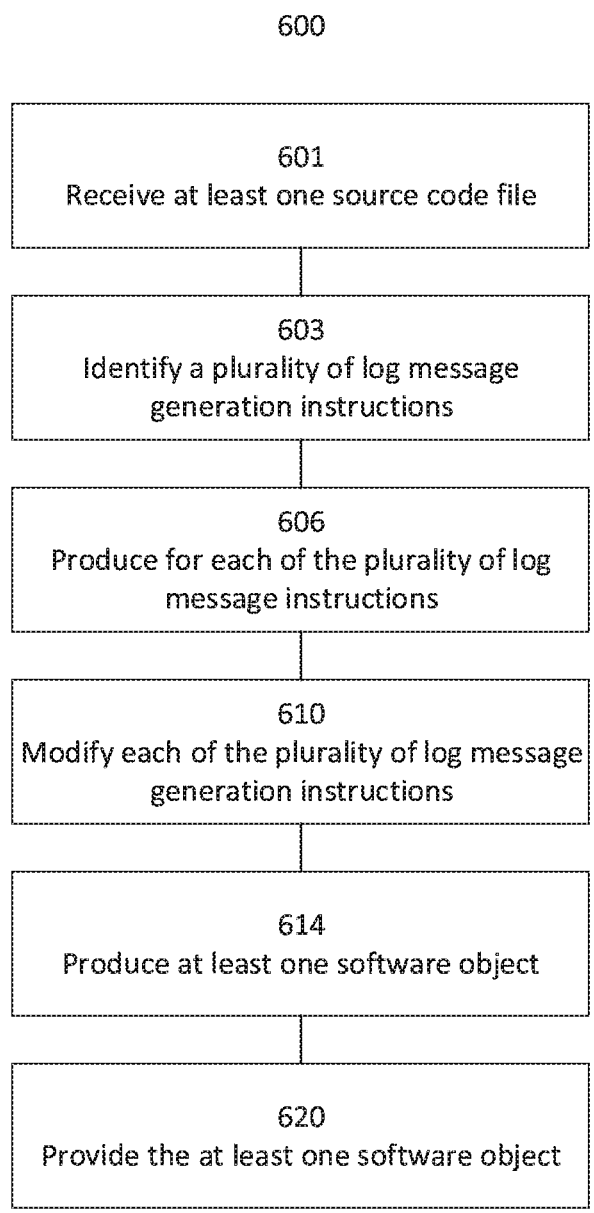
FIG. 6 is a flowchart schematically representing an optional flow of operations for generating executable software, according to some embodiments of the present invention.

Reference is now made also to FIG. 6, showing a flowchart schematically representing an optional flow of operations 600 for generating executable software, according to some embodiments of the present invention. In such embodiments, in 601 processing unit 501 receives one or more source code files, optionally by retrieving the one or more source code files from storage 502. Optionally, processing unit 501 receives the one or more source code files from another processing unit via network interface 503. In 603, processing unit 501 optionally identifies in the one or more source code files a plurality of log generation instructions. For example, the one or more log generation instructions may comprise one or more instructions to invoke an identified set of instructions to generate a message. Optionally, the one or more log generation instructions comprise the identified set of instructions to generate a message. In 606, processing unit 501 optionally produces for each of the plurality of log generation instructions a source code location value. Optionally, the source code location value is indicative of a location in the one or more source code files of the respective log generation instruction. Optionally, the source code location value comprises a location value selected from an identified set of location values. Optionally, each of the identified set of location values has a semantic meaning understood by processing unit 101. Optionally, the source code location value is indicative of a name of a file of the one or more source code files. Optionally, the source code location value is indicative of a line in one of the one or more source code files. A map file is a file comprising information showing a structure of an executable software, for example listing one or more variables identified in the one or more source code files with a respective memory address. Optionally, producing the source code location value for each of the plurality of log generation instructions comprises extracting one or more source code location values from one or more map files comprising information describing the one or more source files. A debug symbol file comprises debug symbols, which can be stripped from a final executable file before distribution, for example a file with .dsym extension produced by Apple Xcode compiler. Optionally, producing the source code location value for each of the plurality of log generation instructions comprises extracting one or more source code location values from one or more debug symbol files comprising debug information describing the one or more source files.

In 610, processing unit 501 optionally modifies each of the plurality of log generation instructions to include the respective source code location value in a generated log. Optionally, when the one or more source code files are in an identified source code language supporting directives, modifying each of the log generation instructions comprises adding to at least one of the plurality of log generation instructions a directive of the identified source code language, for example a directive identifying a file name or a directive identifying a line number. Optionally, modifying each of the log generation instructions comprises adding to at least one of the plurality of log generation instructions one or more instructions to extract a code position value from a retrieved call stack. Optionally, in 614 processing unit 501 produces one or more software objects using the modified plurality of log generation instructions, and in 620 processing unit 501 optionally, provides the one or more software objects to one or more client processing units, for example client processing unit 111, for generating one or more logs, where the one or more logs are indicative of one or more states when providing a service implemented by the one or more software objects. Optionally, providing the one or more software objects to client processing unit 111 comprises sending the one or more software objects to client processing unit 111 via network interface 503. Optionally, providing the one or more software objects to client processing unit 111 comprises storing the one or more software objects in storage 502.

Optionally, at least part of method 600 is implemented in a software development kit (SDK) used for generating the one or more software objects using the one or more source files.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant software location values will be developed and the scope of the term software location value is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for processing logs comprising at least one computing device adapted to:
   receiving a plurality of historical logs each generated by at least one client computing device when executing at least one software object generated from at least one source code file, each of the plurality of historical logs is associated with one of a plurality of sessions and comprising log data and a location value identifying a location in the at least one source code file;
   generating a plurality of log clusters, each log cluster comprising a plurality of logs of the plurality of historical logs, each of the plurality of logs of the respective log cluster comprising a common location value; and
   in at least one of a plurality of iterations:
      receiving from the at least one client computing device, via at least one digital communication network interface connected to the at least one computing device, at least one log comprising current log data and a current location value identifying a current location in the at least one source code file;
      adding the at least one log to at least one log cluster of the plurality of log clusters, selected according to the current location value;
      analyzing the plurality of logs of at least one of the at least one log cluster to identify at least one state in execution of the at least one software object; and
      adding the at least one state to a monitoring process for detecting, when the at least one client computing device executes the at least one software object, the at least one state.

2. The system of claim 1, wherein the plurality of historical logs are further clustered in the plurality of clusters of logs according to the respective log data, where the respective log data is encrypted, without decrypting the respective log data; and
   wherein selecting the at least one log cluster of the plurality of log clusters further comprises selecting the at least one log cluster according to the current log data, where the current log data is encrypted, without decrypting the current log data.

3. The system of claim 1, wherein the plurality of historical logs are further clustered in the plurality of clusters of logs according to a hash value computed for the log data; and
wherein selecting the at least one log cluster of the plurality of log clusters further comprises selecting the at least one log cluster according to a current hash value computed for the current log data.

4. The system of claim 1, wherein the plurality of historical logs are further clustered in the plurality of clusters of logs according to a pattern identified in a sequence of location values of a sequence of historical logs of the plurality of historical logs, where the sequence of historical logs are associated with a common session of the plurality of sessions;
wherein selecting the at least one log cluster of the plurality of log clusters further comprises selecting the at least one log cluster according to a new pattern identified in a new sequence of location values of a new sequence of logs of the plurality of logs comprising the at least one log, where the new sequence of logs are associated with a new common session; and
wherein the new pattern is at least a prefix of the pattern.

5. The system of claim 4, wherein the at least one state is identified according to the new pattern; and
wherein adding the at least one state to the monitoring process comprises indicating at least some of the sequence of location values.

6. The system of claim 4, wherein selecting the at least one log cluster according to the new pattern comprises using a neural network to compute at least one classification in response to input comprising the current location value.

7. The system of claim 1, wherein each of the at least one client processing device is one of a plurality of client processing devices, each adapted to executing the at least one software object.

8. The system of claim 1, wherein analyzing the plurality of logs of the at least one log cluster comprises analyzing a first plurality of logs of a first log cluster of the at least one log cluster;
wherein each of the first plurality of logs of the first log cluster is associated with a plurality of attribute values of a plurality of attributes; and
wherein analyzing the first plurality of logs of the first log cluster comprises computing a plurality of statistical values according to the plurality of attribute values the first plurality of logs is associated therewith.

9. The system of claim 8, wherein the plurality of attribute values comprises at least one of a plurality of attribute values consisting of:
a session identification value, indicative of a session of a plurality of sessions of the at least one client computing device executing the at least one software object;
a user identification value, indicative of a user of the at least one client computing device;
a version identification indicative of a version of the at least one software object;
an operating system version identification indicative of a version of an operating system executed by the at least one client processing device;
a class value, indicative of a software class of the at least one software object;
a function value, indicative of a software function of the at least one software object;
a tag value, indicative of a system component of the at least one client processing device;
a device type value indicative of a device type of the at least one client processing device;
a device identification value, indicative of the at least one client processing device;
a device manufacturer value;
a language identification value;
a region identification value, indicative of a geographical location; and
a time value.

10. The system of claim 8, wherein at least one of the plurality of statistical values is selected from a group of statistical values consisting of:
an amount of sessions executed by the plurality of client computing devices,
an amount of devices in the plurality of client computing devices,
an amount of users of the plurality of client computing devices,
an amount of time,
a percentage that an amount of sessions identified in at least some of the plurality of logs is of the amount of sessions executed by the plurality of client computing devices,
a percentage that an amount users identified in at least some of the plurality of logs is of the amount of users of the plurality of client computing devices,
a percentage that an amount of devices identified in at least some of the plurality of logs is of the amount of devices in the plurality of client computing devices,
an amount of logs, of a plurality of logs of a log cluster of the plurality of log clusters, associated with an identified operating system,
a percentage that the amount of logs associated with the identified operating system is of an amount of logs in the plurality of logs of the log cluster,
an amount of logs, of the plurality of logs of the log cluster, associated with an identified session,
a percentage that the amount of logs associated with the identified session is of the amount of logs in the plurality of logs of the log cluster,
an amount of logs, of the plurality of logs of the log cluster, associated with an identified user,
a percentage that the amount of logs associated with the identified user is of the amount of logs in the plurality of logs of the log cluster,
an amount of logs, of the plurality of logs of the log cluster, associated with an identified version,
a percentage that the amount of logs associated with the identified version is of the amount of logs in the plurality of logs of the log cluster,
an amount of logs, of the plurality of logs of the log cluster, associated with an identified device,
a percentage that the amount of logs associated with the identified device is of the amount of logs in the plurality of logs of the log cluster,
an amount of logs, of the plurality of logs of the log cluster, associated with an identified device type,
a percentage that the amount of logs associated with the identified device type is of the amount of logs in the plurality of logs of the log cluster,
an amount of at least some of the plurality of logs in an identified time interval, and
a percentage that the amount of logs associated in the identified time interval is of the amount of logs in the plurality of logs of the log cluster.

11. The system of claim 8, wherein adding the at least one state to the monitoring process comprises indicating at least some of the plurality of statistical values.

12. The system of claim 8, wherein adding the at least one state to the monitoring process comprises sorting the at least one state according to at least one of the plurality of statistical values.

13. The system of claim 1, wherein the at least one state is at least one of a group of states consisting of: an error in execution of at least one instruction of the at least one software object, a programming error, and an error in accessing at least one resource by the at least one software object.

14. The system of claim 13, wherein the at least one resource is a resource of the at least one client processing device.

15. The system of claim 13, wherein the system further comprises at least one server;
wherein executing the at least one software object by the at least one client processing device comprises accessing at least one resource of the at least one server;
wherein the group of states further consists of an error in execution of at least one server instruction of the at least one server; and
wherein an error in accessing a resource by the at least one software object comprises an error in the at least one software object accessing the at least one resource of the at least one server.

16. The system of claim 1, wherein the at least one client processing device is further adapted to:
generating the at least one log comprising the current log data and the current location value identifying a current location in the at least one source code file; and
sending the at least one log to the at least one computing device.

17. The system of claim 1, wherein the at least one computing device is further adapted to storing the plurality of historical logs and the at least one log in at least one non-volatile digital storage connected to the at least one computing device.

18. The system of claim 1, wherein the at least one computing device is further adapted to:
generating a new log cluster associated with the current location value, subject to failing to select one of the plurality of log clusters according to the current location value;
adding the at least one log to the new log cluster; and
adding the new log cluster to the plurality of log clusters.

19. A method for processing logs comprising:
receiving a plurality of historical logs each generated by at least one client computing device when executing at least one software object generated from at least one source code file, each of the plurality of historical logs is associated with one of a plurality of sessions and comprising log data and a location value identifying a location in the at least one source code file;
generating a plurality of log clusters, each log cluster comprising a plurality of logs of the plurality of historical logs, each of the plurality of logs of the respective log cluster comprising a common location value; and
in at least one of a plurality of iterations:
receiving from the at least one client computing device, via at least one digital communication network interface connected to the at least one computing device, at least one log comprising current log data and a current location value identifying a current location in the at least one source code file;
adding the at least one log to at least one log cluster of the plurality of log clusters, selected according to the current location value;
analyzing the plurality of logs of at least one of the at least one log cluster to identify at least one state in execution of the at least one software object; and
adding the at least one state to a monitoring process for detecting, when the at least one client computing device executes the at least one software object, the at least one state.

20. A system for generating executable software, comprising at least one computing device adapted to:
producing for each of a plurality of log generation instructions identified in at least one source code file a source code location value indicative of a location of the log generation instructions in the at least one source code file;
modifying each of the plurality of log generation instructions to include the respective source code location value in a generated log;
producing at least one software object using the modified plurality of log generation instructions; and
providing the at least one software object to at least one client processing device for generating at least one log indicative of at least one state when providing a service implemented by the at least one software object;
wherein at least one of:
the source code location value comprises a location value selected from an identified set of location values;
the source code location value is indicative of at least one of: a file name and a line number in a file;
modifying each of the log generation instructions comprises adding to at least one of the plurality of log generation instructions a directive of a source programming language of the at least one source code file;
modifying each of the log generation instructions comprises adding to at least one of the plurality of log generation instructions at least one instruction to extract a code position value from a retrieved call stack; and
producing for each of the plurality of log generation instructions a source code location value comprises extracting at least one source code location value from at least one of: at least one map file comprising information describing the at least one source file, and at least one symbol file comprising symbol information describing the at least one source file.

* * * * *